US008623216B2

(12) United States Patent
Vero et al.

(10) Patent No.: US 8,623,216 B2
(45) Date of Patent: Jan. 7, 2014

(54) MAGNETIC RESIN SEPARATOR

(71) Applicants: Gregory Mark Vero, Camberwell (AU); Anthony Michael Browne, Fairfield (AU)

(72) Inventors: Gregory Mark Vero, Camberwell (AU); Anthony Michael Browne, Fairfield (AU)

(73) Assignee: Orica Australia Pty Ltd, Melbourne, Victoria (AU)

( * ) Notice: Subject to any disclaimer, the term of this patent is extended or adjusted under 35 U.S.C. 154(b) by 0 days.

(21) Appl. No.: 13/648,981

(22) Filed: Oct. 10, 2012

(65) Prior Publication Data
US 2013/0056421 A1    Mar. 7, 2013

Related U.S. Application Data

(63) Continuation of application No. 11/721,427, filed as application No. PCT/AU2005/001900 on Dec. 15, 2005, now abandoned.

(60) Provisional application No. 60/636,221, filed on Dec. 15, 2004.

(51) Int. Cl.
*B03C 1/02* (2006.01)
*B03C 1/30* (2006.01)
*C02F 1/42* (2006.01)
*C02F 1/48* (2006.01)

(52) U.S. Cl.
USPC .......... 210/676; 210/222; 210/223; 210/675; 210/679; 210/695; 209/217; 209/223.1; 209/229

(58) Field of Classification Search
USPC ............... 210/222, 223, 675, 676, 679, 695; 209/217, 223.1, 229
See application file for complete search history.

(56) References Cited

U.S. PATENT DOCUMENTS

| | | |
|---|---|---|
| 293,745 A | 2/1884 | Hyatt |
| 2,125,846 A | 8/1938 | Laughlin |
| 2,642,514 A | 6/1953 | Herkenhoff et al. |
| 3,143,496 A | 8/1964 | Maretzo |
| 3,437,207 A | 4/1969 | Fejes |
| 3,560,378 A | 2/1971 | Weiss et al. |
| 3,887,457 A | 6/1975 | Marston et al. |
| 4,039,447 A | 8/1977 | Miura et al. |
| 4,284,511 A | 8/1981 | Weitzen et al. |
| 4,314,905 A | 2/1982 | Etzel et al. |
| 4,523,996 A | 6/1985 | Charles et al. |
| 4,643,822 A | 2/1987 | Parsonage |
| 4,735,725 A | 4/1988 | Reuschl et al. |
| 4,921,597 A | 5/1990 | Lurie |
| 4,981,593 A | 1/1991 | Priestley et al. |
| 5,110,624 A | 5/1992 | Noble et al. |
| 5,116,511 A | 5/1992 | Green et al. |
| 5,230,805 A | 7/1993 | Yates et al. |
| 5,298,179 A | 3/1994 | Ukita et al. |
| 5,310,486 A | 5/1994 | Green et al. |
| 5,397,476 A | 3/1995 | Bradbury et al. |
| 5,476,591 A | 12/1995 | Green |
| 5,628,900 A | 5/1997 | Naito |
| 5,772,877 A | 6/1998 | Dvorchik et al. |
| 5,855,790 A | 1/1999 | Bradbury et al. |

(Continued)

*Primary Examiner* — David A Reifsnyder
(74) *Attorney, Agent, or Firm* — Lathrop & Gage LLP

(57) ABSTRACT

The invention provides a system and process for separating residual magnetic resin from a liquid stream by passing the stream through or over permanent magnets located within the stream wherein the process also includes a means for releasing any resin retained by the permanent magnets and capturing the released resin.

19 Claims, 12 Drawing Sheets

(56) References Cited

U.S. PATENT DOCUMENTS

| | | |
|---|---|---|
| 5,900,146 A | 5/1999 | Ballard et al. |
| 5,944,986 A | 8/1999 | Saho et al. |
| 6,077,333 A | 6/2000 | Wolfs |
| 6,099,738 A | 8/2000 | Wechsler et al. |
| 6,171,489 B1 | 1/2001 | Ballard et al. |
| 6,416,668 B1 | 7/2002 | Al-Samadi |
| 6,669,849 B1 | 12/2003 | Nguyen et al. |
| 7,291,272 B2 | 11/2007 | Bourke et al. |
| 7,785,474 B2 | 8/2010 | Vero et al. |
| 2004/0035760 A1 | 2/2004 | Alford et al. |
| 2005/0274674 A1 | 12/2005 | Mueller et al. |
| 2009/0242487 A1* | 10/2009 | Vero et al. .......... 210/695 |

* cited by examiner

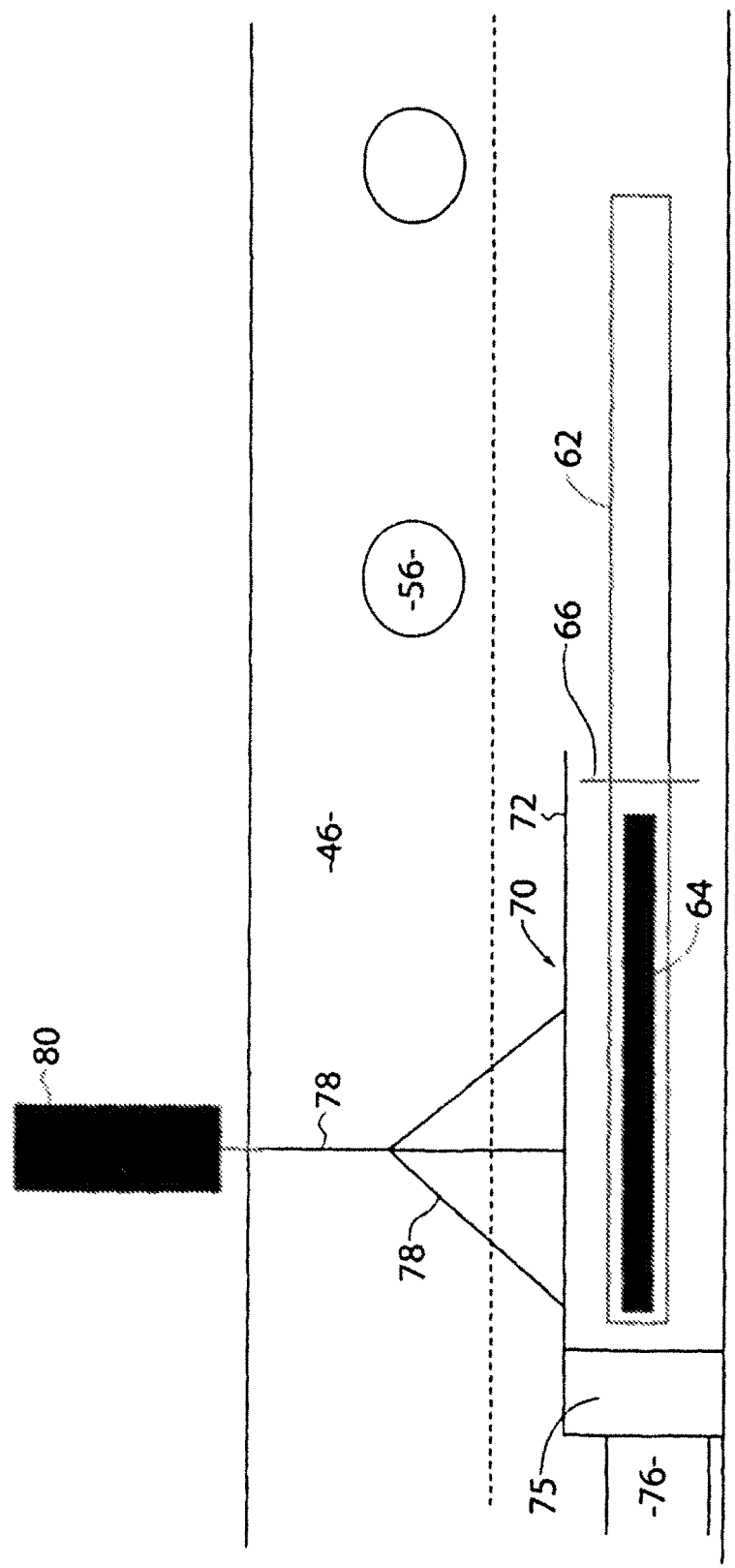

ent exchange resins are1

MAGNETIC RESIN SEPARATOR

CROSS-REFERENCE TO RELATED APPLICATIONS

This application is a continuation of U.S. patent application Ser. No. 11/721,427, filed Sep. 20, 2007, which is a U.S. National Stage application of international application PCT/AU2005/001900, filed on Dec. 15, 2005, which designates the United States, and which claims the benefit of U.S. provisional application 60/636,221, filed on Dec. 15, 2004. Each of these applications is incorporated by reference herein in its entirety.

FIELD OF THE INVENTION

The present invention relates to devices, processes and systems for settling, collecting or separating magnetic ion exchange resins from fluid streams with particular reference to potable water, effluent, sewerage and water polishing systems.

BACKGROUND

Magnetic ion exchange resins have been used to remove various compounds from water supplies and waste streams. The resins are used to remove and concentrate a compound or compounds from a stream and move the compound into another stream. The term "compound" includes chemical compounds, elements and ions.

Ion exchange resins work by having functional groups incorporated within a polymer backbone which bind to compounds present within a solution to be treated. The functional groups can be selected so to provide binding sites suitable for binding to various types of compounds present within a solution. Weak acid cationic ion exchange resins are suitable for separating transition metal ions. Acidic organic materials, such as DOC and other negatively charged ions, will bind to anion ion exchange resins. The binding effectiveness of the resin decreases as the compounds use up available binding sites of the resin. The spent resin is regenerated by applying a regenerate wash solution to the resin to reform the binding sites. Treatment with a regenerant solution produces a wash solution containing the separated compounds.

For ease of handling traditional ion exchange resins are contained within columns and the solution to be treated is pumped through the column. This restricts the types of processes in which the resin can be used.

Magnetic ion exchange resins are a significant improvement over traditional ion exchange resins. These resins have a discrete magnetic core or have magnetic particles dispersed throughout the resin. MIEX® brand resin from Orica Australia Pty Ltd is a magnetic ion exchange resin having magnetic particles dispersed throughout the resin and is particularly suitable for use in removing dissolved organic carbon (DOC) from potable water supplies. It has an advantage over other types of magnetic resins as all parts of the resin contain magnetic particles.

As described in U.S. Pat. No. 6,669,849 magnetic ion exchange resins can be used in the treatment of potable water supplies to remove dissolved organic compounds and are referred to as dissolved organic carbon (DOC). It can be used as part of a multi-step treatment process and can provide a number of benefits in addition to the direct removal of DOC. For example some water treatment processes employ activated carbon as a final polishing treatment to alleviate problems with taste and/or odour, to remove disinfection by-products or to remove any other pollutants. Pre-treatment with MIEX resin may also extend the effective life of the activated carbon.

Magnetic ion exchange resin can also be used in the treatment of waste streams. For example the Kraft process produces a highly coloured black effluent which is often released into water ways. Resin may be used to remove the colouring compounds from the effluent waste stream. Resin can also be used to remove and concentrate heavy metals from waste streams for additional processing.

A benefit of using magnetic ion exchange resins is that the weak magnetic properties of the resin allow the resin particles or beads to agglomerate together and quickly settle in settling tanks. This can facilitate the separation of resin from solution and thereby improve the methods of removing, recycling and regenerating resin. This has removed the need for columns to contain the resin and has permitted new treatment arrangements and methods for regenerating the resin, and continuous flow systems.

Processes for the use and separation of resins for use in the treatment of potable water are known and some have been described in U.S. Pat. No. 6,669,849. Magnetic ion exchange resins are described in U.S. Pat. Nos. 5,900,146 and 6,171,489. Other applications and patents relating to magnetic resins include International Application Nos. PCT/AU2005/001111, PCT/AU2005/000419, PCT/AU2004/000432, PCT/AU2005/000618, PCT/AU2005/001426 and U.S. application Ser. No. 11/124,624. The contents of these documents are incorporated by cross-reference.

There are a number of known methods for settling and separating the magnetic ion exchange resins from solution (or vice versa). Settling tanks and tube settlers are disclosed in U.S. Pat. No. 6,669,849. Such tanks take up a large amount of space and can significantly increase the capital cost of using a magnetic ion exchange resin process. The effectiveness of various existing systems can significantly decrease at higher solution flow rates and with smaller sized particles.

U.S. Pat. Nos. 5,397,476 and 5,855,790 (Bradtec Limited) relate to a method of removing pollutant ions by using magnetic resins. The magnetic resin particles are removed by magnetic filtration from the solution. The method of magnetic filtration is not specifically described.

U.S. Pat. No. 4,523,996 (Charles et al) relates to a differential separation process for use with mixed bed systems for the treatment of water in power plants. A bed contains a mixture of two types of resin beads, namely one type containing ferromagnetic material such as magnetite and another having different magnetic properties. The beads are separated by the use of an inhomogeneous magnetic field (e.g. by applying a permanent magnet to a part of a containment vessel).

U.S. Pat. No. 5,230,805 (Yates et al) relate to magnetically stabilised fluidised particles in liquid media. Fluidised magnetic resins in an upwardly flowing liquid stream are stabilised within a general area by the application of a magnetic field of 25 to 500 gauss, preferably by an electromagnet that encircles the treatment bed. Such an arrangement can avoid the need to use a large settling tank downstream to recover the resin but requires an ongoing strong magnetic field to retain the resin beads with a contact region. It is unlikely that the resin could be economically retained within the region at high flow rates.

U.S. Pat. No. 5,110,624 (Noble et al) relates to a method for preparing magnetisable porous particles (resins). Like Yates above, the ion exchange resins are held within a bed subjected to a uniform magnetic field as a solution is passed upwardly through the bed.

It would be beneficial to provide a solution to the above mentioned capital and effectiveness (at high flow rates) problems associated with using settling tanks such as those used in the traditional MIEX resin process. Ideally the solution would involve equipment which is relatively simple to install, maintain and operate.

Another problem with the use of ion exchange resins in mobile resin systems relates to the damage done to the resin and the associated formation of resin fines and larger particles and fragments or portions of resin beads. These fines, portions and particles may be the product of physical interactions between resin beads themselves or resin beads and the surfaces in contactor, settler or regeneration vessels, mixing blades, pumps or other equipment used in the treatment plant. The interactions damage individual resin beads and produce smaller fragments. Systems designed for separating and recycling the larger resin beads from the treated fluids may not effectively work for the removal of the smaller resin fines, portions or particles.

A solution to this problem is the use of a bed of particulate magnetite such as that described in the co-pending PCT application entitled "Water Polishing Process" by the same applicant filed on 15 Dec. 2005. However, it would also be advantageous if the settler system also removed any resin fines or other particulate matter in the fluid streams.

DESCRIPTION OF THE INVENTION

The invention is predicated on the ability of permanent magnetic materials within a liquid stream to capture resin remaining in the stream after the settling process. The invention also includes a means for releasing, separating and recycling the captured resin.

Throughout this specification, and the claims that follow, magnetic resin includes whole resin beads, damaged resin beads and the portions or particles of resin separated from resin beads that contain magnetic material.

In general the invention involves a process for separating magnetic resin from a liquid stream by passing the stream through a magnetic field provided by permanent magnets located within the stream wherein the process also includes a means for releasing any resin retained by the magnetic field of the permanent magnets and capturing the released resin.

The process is intended to control magnet resin bead loss from treatment plants where the liquid stream has been contacted with resin in a fluidised bed and where resin is agglomerated and settled from within the liquid stream before passing the liquid stream through a magnetic field provided by permanent magnets.

It has now been found that the majority of the resin can be retained and collected from the fluid stream by using a traditional settler system at relatively high flow rates or a smaller settler at a lower flow rate. However, a significant proportion of the resin beads will still remain within the liquid stream flowing from the settler and limits the overall flow rate of the process or require the use of significantly larger settlers to prevent the loss of the resin beads from the treatment process. The residual resin can be successfully and economically recovered by including the above resin separation process after settling most of the resin within the liquid with a resin settler system.

A wide range of resin settling processes and equipment are known and may be used prior to the process of the invention. MIEX settling tanks are preferred, although the process may also have application with magnetically stabilised bed systems such as that described in U.S. Pat. No. 5,230,805 (Yates et al) to capture resin which would have otherwise been lost from the overall treatment process.

It is advantageous to locate the permanent magnets within the liquid stream in order to increase the strength of the magnet field applied to the stream as the magnetic field strength rapidly decreases with distance from the field source.

The process can also remove fines and other resin particles from the liquid stream. The process is coupled to a magnetic resin settling process for agglomerating and settling resin after which the liquid stream comes into contact with a magnetic field provided by permanent magnets within the stream.

Preferably the magnetic resin is magnetic ion exchange resin. More preferably the magnetic properties of the resin exist throughout the resin and not merely at the surface or the core. Most preferably the resin is MIEX® brand resin from Orica Australia Pty Ltd.

A number of different arrangements of permanent magnets and associated systems can be used for separating resin from the liquid stream, after the use of magnetic resin settling systems to agglomerate, settle and separate most of the resin beads from the fluid stream.

In an embodiment of the invention there is a process for separating magnetic resin from a liquid stream by passing the stream, preferably an upwardly flowing stream, through a bed of particulate magnetic material, preferably magnetite.

In this embodiment the particulate magnetic material acts as a filter to capture any resin beads not earlier settled and separated from the stream and thereby reduce the loss of resin beads from the system by physically containing the resin beads within a desired region. It also acts as a polisher by magnetically capturing smaller fragments and fines on the particulate magnetic material.

The resin (including portions and particles thereof) captured by the bed of particulate magnetic material may be recovered from the particulate material by using a wide range of washing systems. In a simple arrangement, the separator would be taken offline and liquid forced back at a high velocity through the material to free the resin particles from the magnetic material.

However it is preferred to use an on-line resin release and recovery system and the design of such a system can depend on the overall plant design. Known on-line systems for separating captured material from particulate filters may be used. For example, a boom arm could spray liquid down onto and through a layer of magnetite or other particulate magnetic material and a cooperating collector could move with the arm beneath the magnetite to collect any separated resin. Air sparging can also be used to enhance the effectiveness of any washing.

Accordingly, in a preferred form of the invention the process includes the additional steps of releasing the resin retained in or on the particulate material by washing the particulate magnetic material with a wash solution (preferably process liquid), and optionally air sparging.

The wash solution itself can be recovered and reused in future wash cycles. Alternatively the wash solution may simply comprise a treated fluid stream and, after use as a wash solution, may be filtered or otherwise treated to remove at least most of the separated materials and the filtrate could be then returned to the contactors.

The above system for separating resin from the fluid streams will controllably release retained resin for capture and recovery. The resin beads that had been retained could be separated from the wash solution and returned to contactor tanks associated with the fluid treatment process. Although the freed resin beads and portions, particles and fines of resin beads could be collected and appropriately disposed, it is also envisaged that in some instances the freed materials could contain beneficial materials which could be separated from the wash solution and used. This is because the particulate magnetic material should capture and remove resin and resin fines from the liquid stream and may also beneficially co-remove other materials present in the treated stream. The particulate material can act like a sand filter and therefore may trap non-magnetic materials such as plant matter as well as the magnetic resin fines. However, the presence of non-magnetic solid material can be a significant issue with raw water treatment plants for the treatment of water collected from a dam or similar water source. Solid matter contaminants can be less of an issue with bore or other underground water sources.

Preferably the particulate magnetic material comprises magnetite and has an average particle size between 0.3 to 50 mm.

Preferably the bed of particulate magnetic material comprises a first layer of particulate magnetic material having a first average particle size and a second layer of particulate magnetic material of a second average particle size different to the average particle size of the first layer.

Preferably the solution passes through the first layer of the bed before passing through the second layer of the bed, and the first layer has an average particle size larger than that of the second layer.

More preferably, the particulate magnetic material of the second layer has an average particle size from 1.5 to 6 mm and the first layer has an average particle size from 6 mm to 10 mm, and is preferably magnetite.

Although the particulate material is preferably magnetite, it should be understood that other sources of magnetic fields could be used such as natural magnetic minerals, synthetic magnetic materials, combinations or composites of both. Magnetite is simply a convenient material to work with due to the low cost and high availability.

In addition to the use of other materials having permanent magnetic properties, the magnetic field could be induced or enhanced by the use of an electromagnet. A magnetic field could be induced within coil(s) located within a body of particulate material. However, electromagnets are not favoured due to the ongoing cost for power compared to the use of magnetite.

In another embodiment of the invention there is provided a process for separating residual magnetic resin from a liquid stream by locating a stream contact surface within the stream, having permanent magnets located behind the contact surface which provide a magnetic field that extends though the contact surface and into the stream and which is capable of attracting and retaining magnetic resin onto the contact surface and where the magnetic field can be reduced or removed in response to an actuation means so as to release resin retained on the contact surface. Preferably the magnetic field is reduced or removed by moving the magnet away from the stream contact surface.

Preferably, the stream is contacted with an outer contact surface of at least one hollow elongate member containing moveable permanent magnets located at a first position within the member, wherein the magnets provide a magnetic field which extends into the stream and attracts and retains magnetic resin on the outer surface of the member, the magnets being movable to a second position within the elongate member in response to an actuation means, at which second position resin retained on the outer surface is released from the member.

The above separating process is preferable coupled with a magnetic resin settling process which agglomerates and settles most of the resin from within the stream before the stream contacts the outer surface of one or more elongate members (with the magnets located in the first resin retaining position).

Preferably, the elongate members are arranged within the liquid stream so as to expose the stream to sufficient magnetic attractive force to separate resin from the stream. This may require an array of elongate members positioned and suspended within the fluid stream. Preferably, the stream flows along or near at least a portion of one or more elongate members, more preferably the stream flows in the direction of elongation. Suspending members within the stream and having the stream flow along the length of the members may maximise the exposure of the resin (and other magnetic particles) within the stream to the attracting magnetic forces exerted by the magnets from within the members.

When releasing the magnetic resin from the outer surface of the members it is preferred to reduce the likelihood that the resin will be recaptured by the member when the magnets are moved to the second position. This can be done by simply orientating the member within the stream so that the first retaining magnet position is located downstream from the second release position. The force of the fluid flowing downstream will resist the upward movement of the resin when the magnets are moved from the first position to the second position. Also, when the resin is released from the member it will continue to flow downstream past the member and should not be again captured by the member.

It should also be appreciated that any resin retained on the members when the magnets are located in the second upstream end of the members will be released into the stream when the magnets are returned to the normal operating position at the downstream end of the member. This should not be an issue as the released resin should be recaptured and retained on the contact surfaces of the members once the magnets are returned to the normal operating position, as the attracting magnetic field would have been shifted to the downstream end of the members and should therefore attract the resin from the stream as the stream flows past the members.

Accordingly, in a preferred embodiment the members are arranged within the fluid stream so that the first magnet position is located downstream relative to the second position.

The release of the resin can be further improved by including a flange which extends outwardly and circumferentially from the outer surface of the members at an appropriate location to prevent the motion of resin beyond the flange as the magnets are moved from the first position to the second position.

Preferably, all of the magnets are located on one side of the flange when the movable magnets are located in the first position and, when the magnets are located in the second position, all of the magnets are located on the other side of the flange. One of the advantages of this arrangement is that when combined with locating the first resin retaining position of the magnets downstream from the second upstream release position of the magnets, any retained resin that moves with the magnets when the magnets are moved upstream, will be prevented from moving past the flange and should no longer be held to the member by the magnetic fields. The resin will be released from the member as the strength of the retaining magnetic field acting in the resin decreases as the magnets are moved away from the resin, upstream past the flange. When released from the member, the resin will continue to flow downstream within the stream flowing past the member.

Whilst the above arrangement may provide an effective means for separating retained resin from the members, it is expected that other arrangements may also work and are intended to be encompassed by the present invention. For example, when the magnets are located in the second position, the magnets may be positioned out of the flow of the liquid stream so as to avoid retaining resin. This can be achieved by having a portion of hollow elongate member extending out of the liquid stream. Alternatively, the liquid stream may be shielded from the magnetic field produced by the magnets when the magnets are in the second position by having the associated portion of the member surrounded by a suitable shielding material.

The resin can be released from the members by moving the magnets from the first position to the second position by use of an appropriate actuating means. A wide range of systems could be utilised to move the magnets such as a push/pull rod or by pneumatics. In an embodiment of the invention the magnets are moved by a burst of compressed air. The magnets can be returned to the first position by the use of the same system.

This arrangement allows for the controlled release of resin from an elongate member. The resin can be captured by redirecting the ordinary flow of the stream into a capture vessel and shortly before or thereafter releasing the resin from a member.

The fluid stream may flow in any direction over the members. For example an upwardly flowing stream could flow over elongate members which extend in the direction of the upward flow. Alternatively, the fluid stream could flow along a trough having the elongate members located therein or the fluid stream could also flow downward over downwardly extending members. The latter arrangement may offer an additional advantage in that gravity would assist in retaining and returning the magnets to the downstream end of the members.

In a preferred embodiment, a stream of fluid would flow upwardly through a resin settling tank, so as to first settle most of the resin within the stream. At the top of the settler the stream would flow into a launder (a trough) which would gather the stream and direct it into a pipe or chute for any further processing. The launder, pipe or chute could be fitted with a magnetic resin separator as described above.

The use of permanent magnets permits the application of an ongoing magnetic field to the flow to attract and retain the resin without the need of electrical power and thereby avoiding the significant power costs associated with the use of electromagnets.

The above magnetic separator can also operate to remove magnetic resin from fluid streams containing solid matter contaminates such as leaves and plant debris in systems in which the other contaminates may have caused significant problems. Some water treatment plants are designed to separate such contaminates further downstream. Unlike the earlier described bed of particulate magnetic material which could get clogged with such contaminates, they should not interfere with the operation of the above magnetic separator.

The above system for separating resin from the fluid streams will controllably release retained resin for capture and recovery. The resin beads that had been retained could be separated from the captured liquid stream and returned to contactor tanks, regeneration process or otherwise stored. Although the freed resin beads and portions, particles and fines of resin beads could be collected and appropriately disposed, it is also envisaged that in some instances the freed materials could contain beneficial materials which could be separated from the wash solution and used.

The inventors have found that by passing the settled liquid stream containing residual magnetic resin through or over permanent magnetic material such as a bed of particulate magnetic material, such as magnetite, or over elongate members containing moveable magnets, it is possible to effectively capture and recycle the residual resin beads present in the liquid stream. This can allow the conventional or high rate resin separation processes to be operated at higher flow rates than those calculated for normal operation because of the resin that would have otherwise been lost from the overall process can be effectively recovered and recycled. It may also permit the use of less efficient settler systems.

Furthermore the arrangement also removes most if not all the resin fines, particles and other fragments of magnetic resin which would have otherwise remained in the liquid, such as treated water, after using a conventional (MIEX® or other) separation process or a high rate separation process. High flow rate processes can damage the resin as well as increasing the amount of beads, particles and portions of resin remaining in the separated water after conventional resin settling systems.

The above-described processes can be incorporated into current raw water treatment system by the inclusion of additional equipment. An inlet of a tank containing an above-described separator system may be in fluid communication with the liquid stream outlet of a resin settler with the treated liquid flowing from an outlet of the tank containing the separator.

More preferably the separator can be combined with the resin settler. In a further embodiment of the invention there is provided a combined resin settler separator having an inlet through which a stream of liquid and resin flows into the settler, a resin outlet located near or at the bottom of the settler whereby settled resin can be removed from the settler (and typically returned to a separate liquid and resin contactor tank), a liquid outlet located near or at the top or rim of the settler, whereby the stream flows upward through the settler and then through an above described magnetic separator, such as a bed of particulate magnetic material before the stream flows out of the settler separator.

In a number of existing settlers the liquid flows upwardly out of a central aperture in the settler and is collected by launders located around the aperture and the liquid then flows to any further liquid treatment equipment. This settler can be fixed with the magnetic separators by placing a bed of particulate magnetic material within or around the aperture or in a channel collecting the run off from the launders. Alternatively the elongate members containing magnets can be located in the launders or in the channel collecting the run off from the launders.

Although the magnetic material is preferably denser than the solution it is operating in and therefore settles in the solution within a tank, it should be understood that particulate magnetic material could be floated within or held in place on top of the tank.

The material may be restrained within a buoyant vessel within or on top of the tank and held in place by a screen. The solution could be pumped into the tank, flow upwardly through the material and overflow the top of the tank. The resin would be held within the magnetic material and the overflowing polished solution would be collected. The buoyancy property of the vessel may facilitate removal, washing and return of the material to the process.

The separator can also be combined with a contactor/settler. Thus in a further embodiment of the invention there is provided a combined resin contactor and settler tank, the tank including a lower portion for contacting liquid with the resin, a liquid inlet at or near the base of the tank through which the liquid will flow into and upward through the tank, a resin inlet for adding resin into the tank, optionally an agitator for agitating the liquid with resin, the tank including a resin settler in an upper section of the tank whereby the bulk of the resin agglomerates within the upwardly flowing liquid stream and falls by gravity towards the lower contactor portion of the tank, the tank also comprising a top portion through which the upwardly flowing stream of liquid and residual resin flows over or through permanent magnets whereby the residual resin is retained on the magnets and is thereby separated from the liquid stream exiting the tank.

BRIEF DESCRIPTION OF THE FIGURES

The invention will now be further described with reference to the following non-limiting examples. All percentages used herein are by weight unless otherwise stated.

FIG. 5A illustrates the moveable magnet in the downstream configuration.

FIGS. 6A and 6B are side views of the separator in the launder of FIGS. 5A and 5b, respectively, in combination with a flow guide. FIG. 6A illustrates the moveable magnet in the downstream configuration. FIG. 6B illustrates moveable magnet in the upstream configuration.

DETAILED DESCRIPTION OF THE INVENTION

Figure 1:
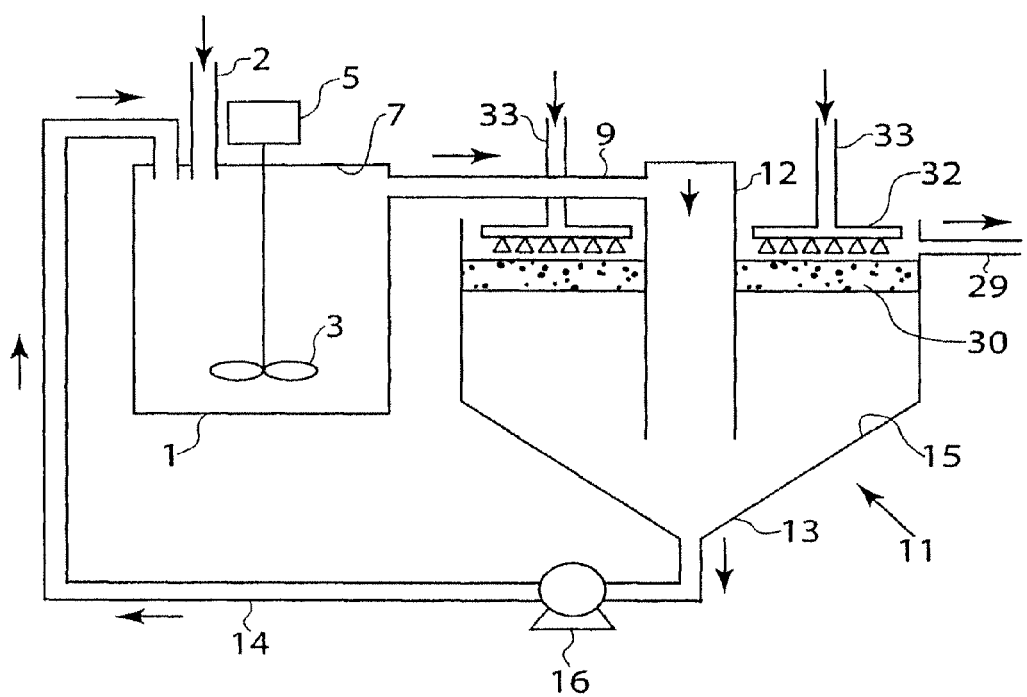
FIG. 1 is a schematic diagram of a combined settler and separator for use in a potable water treatment system. The separator has a layer of particulate magnetic material.

FIG. 1 depicts a means for improving existing settler technology performance and lowering capital cost by the addition of a bed of particulate magnetic material on the top of the settler, just below the water outlet. Resin, which would have otherwise been carried over with the outflow water from the settler, would be captured in the bed of particulate magnetic material. This would allow settler to be designed to operate at high rise rates, since the additional resin loss would be caught in the bed of particulate magnetic material.

The bed of particulate magnetic material could be washed of accumulated resin by a variety of techniques, including water spray nozzles, air sparging or flushing with high flow rate water. The washed off resin would be recycled by being returned to the treatment process or sent to waste.

Alternatively, the collected resin may be sieved or size classified by some other method to separate the larger materials for recycling from the smaller magnetic particles and any retained non magnetic particles, which could be sent to waste.

This enhancement of the inclusion of a post settling magnetic recovery of resin step and then recycling the resin could also be conducted in a separate step, downstream of the settler.

The depicted system includes a contactor comprising a tank (1), an agitator (3) connected to a motor (5), the tank having an open mouth (7) by which raw water is added to the tank via raw water inlet pipe (2). The arrowheads show the direction of the fluid flow.

The tank outlet pipe (9) connects the contactor tank to a settler (11) via the settler inlet pipe (12). A mixture of resin and water flows into the settler from the contactor. The resin will agglomerate, settle and gather at the base (13) of the settler. The inclined surface (15) further assists in the agglomeration of the resin.

The concentrated resin is pumped from the base of the settler by a low impact pump (16) (e.g. an air lift or recessed impeller pump) from an outlet at the base of the settler into the contactor via settler resin return pipe (14).

Water together with a small amount of resin will rise up into the bed of particulate material (30) as water and resin flows into the settler from the contactor. The bed captures the resin and the water passes through the bed and over flows from the settler. The polished water leaves the settler via the outlet pipe (29). Alternatively, the water may simply overflow the rim of the settler and is collected below.

The system is fitted with water spray nozzles (32), connected to rinse water pipes (33), for use in removing resin captured in the bed (30). When the bed is to be cleaned, the settler (11) can be taken offline and water would be pumped through the nozzles (32) through the bed. The wash water and resin particles would then be collected from the settler and the washed off resin would be recycled by being returned to the treatment process or sent to waste. As alternatives to using the settler tank to contain the wash water and washed resin, a capture container could be moved into position under the bed and used to collect the washed off resin or bed could be removed from the settler for separate washing.

The bed of particulate magnetic material (30) may comprise a single layer or may comprise two layers (or more layers), a lower layer of magnetite having a larger average particle size and an upper layer of magnetite having a smaller average particle size.

In a similar configuration to FIG. 1, existing coagulant based water treatment processes with a contacting tank followed by tube or plate settlers, could be retrofitted with a magnetic recovery step and operated with resin.

Figure 2:
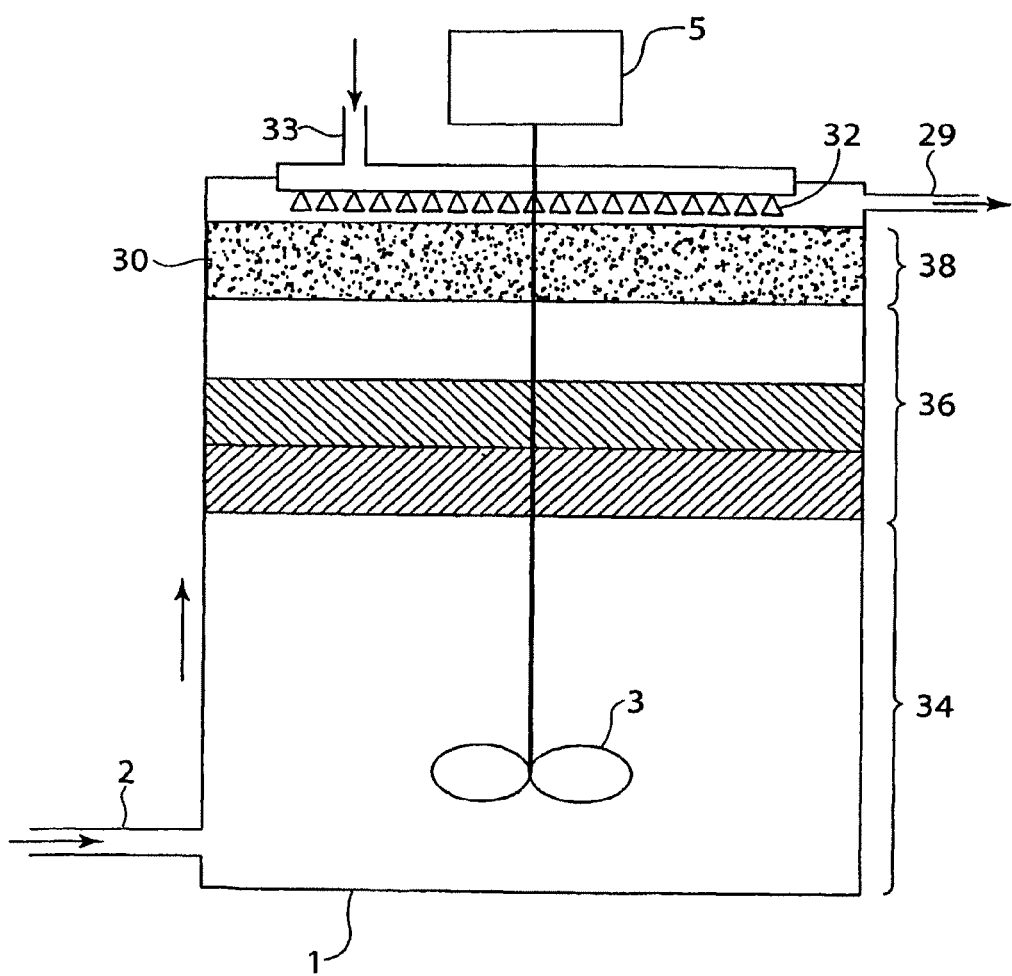
FIG. 2 is a schematic diagram of a combined contactor, settler and residual resin separator for use in a potable water treatment system. The separator has a layer of particulate magnetic material.

A further alternative is to integrate the settler and magnetic media bed into the one process unit with the contactor as shown in FIG. 2. This may provide significant benefits such as a lower footprint and substantially reduced capital costs.

The combination system can be divided into a resin contacting section (34), a first stage settler section (36) and a water polisher section (38). The system comprises a tank (1), a raw water inlet pipe (2) by which raw water is added to the tank. The arrowheads show the direction of the fluid flow. The tank (1) includes an agitator (3) connected to a motor (5). Resin is also located within tank section (34) and additional resin may be added to that section via the raw water inlet (2) or another inlet in that section (not shown).

Most of the resin is expected to remain within section (34) as raw water is added into the tank. The resin treated water and some resin will rise upward as additional water is pumped into the bottom part of the tank and will flow into the settler section (36).

Assorted settler systems could be used such as tube or plate settlers. Resin settled during the process may fall downward, against the upward flow of water, into the contactor section of tank.

The water continues upwards past the settlers into the polisher section (38). As the water is pushed upward it flows through a bed of particulate magnetic material (30). The bed should capture any resin, including resin fines, remaining in the water. The bed (30) may be as earlier described in FIG. 10.

Finally, the polished water is pushed towards the top of the container, where it leaves the system via outlet (29).

Like that depicted in FIG. 1, the system also includes water spray nozzles (32) connected to rinse water pipes (33), for use when cleaning the bed (30).

The separator systems depicted in FIGS. 1 and 2 can be retrofitted into magnetic resin processes into existing water treatment plant sedimentation bays and other types of water treatment clarifiers.

Figure 11:
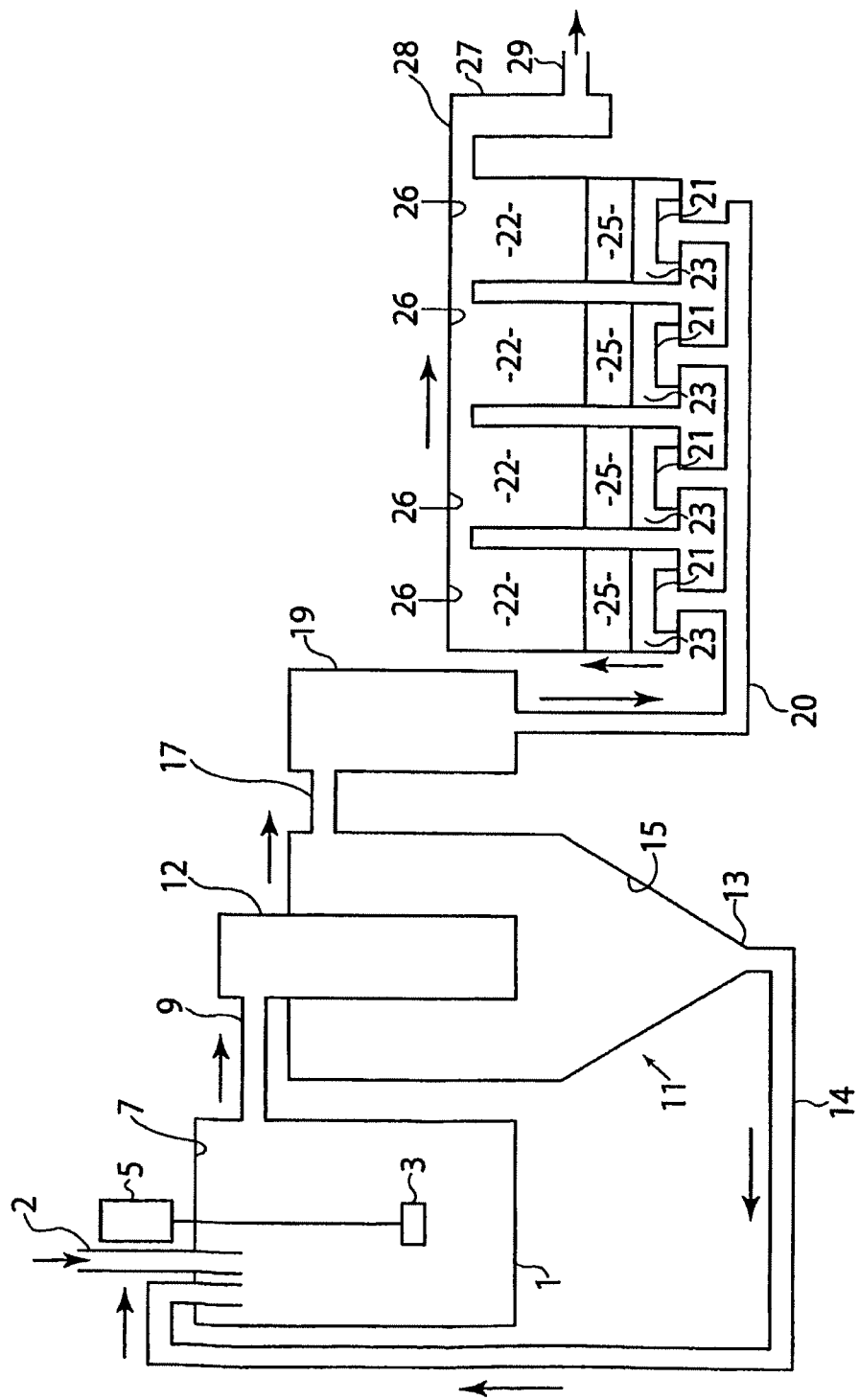
FIG. 11 a schematic diagram of a potable water treatment system used to test the effectiveness of particulate magnetite beds. The arrowheads show the direction of the fluid flows.

The effectiveness of using a bed of magnetite to capture and release resin was tested by using a water treatment system as shown in FIG. 11.

The arrangement depicted in FIG. 11 includes a resin contactor comprising a tank (1), an agitator (3) connected to a motor (5), the tank having an open mouth (7) by which raw water is added to the tank via raw water inlet pipe (2). The arrowheads show the direction of the fluid flows.

The tank is preloaded with MIEX® resin and raw water flows into the tank at a substantially constant regulated rate via raw water inlet pipe (2). The tank outlet pipe (9) connects the contactor tank to a 1.2 m² in diameter settler (11) via the settler inlet pipe (12). A mixture of resin and water flows into the settler from the contactor. Despite the small size of the resin (MIEX® resin has an approximate mean size of 150 microns), it quickly agglomerates and gathers at the base (13) of the settler. The inclined surface (15) further assists in the agglomeration of the resin. Concentrated resin is collected and pumped with a low impact pump (eg an airlift or recessed impeller pump) from an outlet at the base of the settler into the contactor via settler resin return pipe (14).

In a water treatment plant a portion of the collected resin may be subjected to a regeneration process before being returned to the contactors.

Water together with resin fines and any non settled resin beads continuously overflows the settler and is collected and transported via pipe (17) to a buffer tank (19). The amount of 'lost' overflow resin will depend on system design and flow rates and may be in the order of 1 to 4 ppm. It is believed the buffer tank could be omitted in most water-treatment plants. The water together with the magnetic resin fines, portions and particles is pumped via the polishing tank feed pipe (20) through the polishing tank inlet (21) located at the base of the polishing tanks (22).

The depicted system has four 205 litre polishing tanks connected in parallel. The water is pushed through two grades of magnetite, a 100 mm bed (23) having an average particle size of 6 to 10 mm, followed by a 200 mm bed (25) having an average particle size of 1.5 to 6 mm. The polished water overflows the upper rims of the polishing tanks into the interconnecting polishing tank outlet system (26), and is collected and transported by pipe (28).

For testing purposes the polished water is then passed through a bag filter (27). The bag filter would not normally be used in a water treatment plant. It was included in the depicted system to assess the effectiveness of the system. In a water treatment plant the water exiting the outlet (29) may then be considered potable or may be subjected to further down stream treatments, such as chlorination or fluoridation. For testing purposes the water from outlet (29) was fed back into the contactor (1).

Example 1

The system depicted in FIG. 11 was operated at a 9 m/h upflow rate through the magnetite beds of the polishing tanks (22).

| Run time (h) | Flow Rate m³/h | Bed upflow rate m/h | Bag filter capture mL | Bag filter capture mL/h |
|---|---|---|---|---|
| 0 | 10.25 | 9.71 | | |
| 4 | 10.28 | 9.73 | <1 | 0.25 |
| 8 | 10.15 | 9.61 | 1 | 0.25 |
| 12 | 10.15 | 9.61 | 4 | 1 |
| 16 | 10.24 | 9.70 | 1.5 | 0.35 |
| 21 | 10.38 | 9.83 | 1.5 | 0.3 |
| 25 | 10.17 | 9.63 | 2 | 0.5 |
| 34 | 10.1 | 9.56 | 4 | 0.5 |
| 39.5 | 10.37 | 9.82 | 3.5 | 0.7 |
| 47 | 10.15 | 9.61 | 3 | 0.5 |
| 56 | 10.37 | 9.82 | 4 | 0.4 |
| 63.5 | 10.35 | 9.80 | 2 | 0.4 |
| 79.5 | 10.35 | 9.80 | 2 | 0.1 |
| 89.5 | 10.17 | 9.63 | 2 | 0.2 |
| 96.5 | 10.30 | 9.75 | 3 | 0.3 |
| 104 | 10.30 | 9.75 | 2 | 0.2 |
| 104 hours total | 10.25 m³/h avg | 9.71 m/h avg | 35.5 mL total | 0.4 ml/h avg |

The test was run for 104 hours at an average run time at 10.25 m³/h. This means the system would have treated 1.066 mL of raw water.

The bag filter was examined and found to have captured 35.5 ml of material. This corresponds to 33.3 mL/ML.

The estimated loading on the magnetite bed is 80 mL/h (7.8 L/ML), which corresponds to 8.3 litres of resin. The estimated capture efficiency is 99.57% (8.2645/8.3*100).

Example 2

At the end of the Example 11, the flow rate was reduced to 5 m³/h and three of the four magnetite beds were taken off line. This had the effect of increasing the up flow rate through the magnetite beds to 18.9 m/h (5 m³/h/0.264 m²/h). The pilot plant was run at this rate for two and one half hours during which time the bag filter capture was less than 2 mL. It was concluded that the higher up flow rate did not result in the release of the resin fines, portions or particles loaded onto the magnetite beds, which was estimated to be 2.1 kg of magnetic resin material.

Example 3

Following on from example 2, the flow rate was increased to 7.55 m³/h, which had the effect of increasing the up flow rate through the beds to 28.4 m/h (7.5 m³/h/0.264 m²/h). The pilot plant was run at this rate for one and one half hours, during which time the bag filter captured less than 2 mL of material. The higher up flow rate had therefore not caused the release of the resin fines and other fragments loaded onto the magnetite beds, which was estimated to be 2.1 kg of resin material.

Example 4

Following on from example 3, the flow rate was increased to the highest possible rate of 15.5 m$^3$/h which had the effect of increasing the up flow rate through the filter to 58.7 m/h (15.5 m$^3$/h/0.264 m$^2$/h). The pilot plant was run at this rate for twenty minutes, during which time the bag filter captured 600 mL of material. The higher up flow rate had therefore caused the release of a significant amount of the resin fines, approx 25% of the resin material loaded onto the magnetite beds.

Example 5

One of the magnetite beds was dissected to determine where the captured resin material was residing in the bed. 50 mm deep sections of the bed were removed and washed over a 1.5 mm mesh to remove any MIEX®DOC resin material attached to the media.

In the top 3 layers i.e. the top 150 mm of the fine media (1.5 to 6 mm magnetite) were found to contain 80 mL of sub 1.5 mm material. This material was mostly magnetite fines and virtually no MIEX®DOC resin was present.

The fourth layer contained 70 mL of material that was sub 1.5 mm, but in this case about 5 mL of the material was MIEX®DOC resin. The remaining media (6 to 10 mm magnetite) was removed as one layer and was found to contain 2150 mL of MIEX®DOC resin.

Example 6

High Up Flow Wash with and without Air Sparge 15.25 m$^3$/h was forced through one of the magnetite beds (58 m/h) for 1 hour. During this time 950 mL of resin material was flushed from the bed. Following this, air was added to help remove the remaining resin, which resulted in the removal of a further 1000 mL of resin material.

The magnetite bed material was then manually removed and hand washed. A further 700 mL of material was collected, although quite a lot of this material was magnetite fines (approximately 30%).

It was concluded that 2450 mL resin was in the magnetite bed (2650 mL of sub. 1.5 mm material contained in the filter bed less an estimated 200 mL of magnetite fines). This means that approximately 950 mL removed by 58 m/h water up flow, which corresponds to 39% and 1950 mL removed by air and 58 m/h water upflow, which corresponds to 80%. Higher removal efficiencies are expected with higher water flow rates.

It was noted that the tested air distribution was not ideal which lead to poor resin material removal from the water streams on one side of the magnetite beds. Higher removal efficiencies could be expected with a better air distribution system.

It was also observed that if the water level was dropped below the bed, then a stream of water from a hose directed onto the bed and moved about, effectively washed most of the resin material out.

It was concluded that the use of particulate magnetite provided an effective means for separating magnetic resin fines, portions and particles from the water and the captured resin material could be readily removed from the material by the use of a back washing and sparge system.

It was also concluded that the particulate magnetic material could be used in existing types of sand filtration systems as a replacement or blended or layered with the filtration media to enhance the removal of magnetic resin fines, portions and/or particles.

Example 7

A further series of tests were conducted to determine the relationship between maximum upflow rate and the average particle size of the magnetite and the depth of the magnetite bed. The results of the tests are shown in table 2.

Two magnetite media sizes, (1.5 to 6 mm and 6 to 10 mm) were evaluated, in single media fixed beds with bed depths ranging from 50 to 350 mm.

The bed depths used in the 1.5 to 6 mm media trials were 50 and 350 mm. The 50 mm deep bed depth was tested as it was considered to be the shallowest depth that would be likely to be used in application situations, e.g. a shallow layer of magnetite placed just below the weirs of a conventional clarifier. The 350 mm bed depth was tested because it would provide data on bed depths likely to be used in retro fitted sand filters.

The bed depths used in the 6 to 10 mm media trials were 50, 100, 150 and 350 mm. The bed depths larger than 100 mm were used to test the resin retaining capacity of magnetite beds comprising larger size particles.

Preliminary trials with the system depicted in FIG. 11, in an arrangement like that used in example 2 (ie a single bed test) resulted in dramatic channeling effects, over the inlet (21) but also around the walls of the polishing tank when shallow beds were tested. The polishing tank and inlet system was modified to even out the flow patterns from the inlet. The other apparatus remained as described in FIG. 11.

The polisher tank was formed from a 205 L drum. The tank included a water inlet at the base of the tank and a water outlet at the top of the tank. Intermediate to the inlet and outlets was located a substantially horizontal plate containing 4 mm holes spaced 30 mm apart. The plate was located 300 mm from the base of the drum. On top of the plate was located 100 mm lengths of 90 mm pipe in an upright arrangement. A 1.5 mm support mesh was located on top of the pipes and the magnetite particles were located on top of the mesh.

The inlet pipe entered the tank through the substantially horizontal base of the tank and the pipe included a substantially right angle bend within the tank. This arrangement resulted in a substantially horizontal flow of water exiting inlet pipe. The arrangement dissipated the force of water by generating a swirling motion in a region between the base of the tank and the holed plate. Passing the water through the 4 mm holes in the plate provided an even upward flow of the water. The water then passed through the vertical pipe sections located on top of the holed plate. The pipes provided vertical baffling to reduce any residual swirl that might be present and also provided a space between the magnetite bed and the plate holes which allowed most of the force of the water jetting through the 4 mm holes to dissipate before entering the magnetite bed.

The same test method was used in each experiment. The method included a pre-wash phase in which the contactor and settler was filled with water, the agitator and recycle pump was then started and the water flow was diverted through the bag filter to retain the carryover resin. The ball valve on the feed line to the contactor (after the magnetic flow meter) was adjusted to achieve a 10 m/h flow rate into the contactor and then water was added to the buffer tank until the system comes into hydraulic balance. MIEX® resin was then added to the contactor (5 pails) and the air lift pump was started (air flow rate 0.6 N m$^3$/h). The bag in the filter was changed as required (when pressure rise is observed). The volume of resin fines captured by the filter after settling for first sample period was then determined, and the process continued until the fines were removed as determined by visibility in the settler, approx. 20 cm visible depth (estimated 6 hours). The conditioned resin was removed and the new resin added and the process continued until sufficient resin for the trial was pre-conditioned, after which the water was drained from the system.

The magnetic trap was assembled by inserting a holed base plate in a 205 litre drum and securing the plate 300 mm from the bottom of the drum. On top of the holed plate was vertically placed fifteen 100 mm long sections of 90 mm pipe and 10*20 mm wire mesh was placed on top of the pipe sections and then 1.5 mm wire mesh on top of the support mesh. The desired amount of the desired magnetite size fraction was poured onto wire mesh and leveled out before the assembled magnetic trap was flooded with water from below. The initial 50 litres (approx) of water were sent to waste as the water contains silica and other turbidity containing material. The magnetite was not re-magnetised between trials.

Each trial was conducted by filling the contactor and settler with water, the agitator and recycle pump was then started and the ball valve on the feed line to the contactor (after the magnetic flow meter) was adjusted to achieve the desired flow rate into the contactor (5 to 14 m³/h). Water was added to the buffer tank until the system comes into hydraulic balance and the pre washed resin was added to the contactor (30 litres). The air lift pump was started and the system allowed to come into balance. The water flow was then diverted through the magnetite trap and then through the bag filter to retain carry-over resin material. The contactor was sampled to determine the resin concentration and resin was added or removed to achieve the desired resin concentration (12 mL/L). The bag in the filter was changed every 4 to 12 hours (as required) and the volume of resin material captured by the filter after settling for 1 hour was determined. The trial was run for the desired operational period or until resin breakthrough occurs on the magnetic trap after which the system was shut down and the magnetite removed from the magnetic trap and washed over a 1.5 mm screen to determine the volume of resin material that was retained. The remainder of the magnetic trap was removed and cleaned for use in the next trial. The subsequent trials used the same resin as the previous trial with the addition of sufficient fresh pre-wash resin to restore resin inventory.

TABLE 2

Performance of magnetic entrapment using magnetite of various particle sizes and bed depths while operating at various up flow rates.

| Magnetite particle size mm | Depth of magnetite bed mm | up flow rate m/h | loading rate L/ML | bed capacity L/m² | Removal efficiency % | Product water solids L/ML |
|---|---|---|---|---|---|---|
| 1.5 to 6 | 50 | 21 | 5.4[a] | >61 | 94 | 0.321 |
|  |  | 26 | 4.4 | 89 | 86 | 0.394 |
|  |  | 31 | 3.2 | >37 | 87 | 0.406 |
|  |  | 34 | 3.5 | 43 | 91 | 0.304 |
|  |  | 38 | 3.3 | <20 | 95[b] | 0.802 |
|  |  | 44 | 6.1 | <13[c] | 86[c] | 0.84 |
| 1.5 to 6 | 350 | 34 | 5.5 | 58 | 99 | 0.031 |
|  |  | 40 | 4.2 | 36 | 98 | 0.075 |
|  |  | 47 | 6.5 | 25 | 98 | 0.113 |
|  |  | 51 | 4.5 | 21 | 98 | 0.174 |
| 6 to 10 | 50 | 33.3 | 4.4 | 20[c] | 81[c] | 0.83 |
| 6 to 10 | 100 | 27 | 2.3 | 47 | 77 | 0.541 |
|  |  | 33.3 | 3.1 | 28 | 82 | 0.544 |
|  |  | 38.5 | 4.5 | 0 | 65 | 1.59 |
| 6 to 10 | 150 | 33 | 2.6 | 45 | 84 | 0.399 |
| 6 to 10 | 350 | 33 | 3.4 | 47[b] | 88[b] | 0.412 |
|  |  | 39 | 4.5 | 14[c] | 82[c] | 0.805 |

Notes:
[a] only one launder was used to increase carryover
[b] the accuracy was effected by extended post breakthrough run
[c] the accuracy may be effected by the limited data points It was concluded that the volume of water that could be treated before breakthrough reduced as up flow rate increased. The volume of water that could be treated before breakthrough reduced with reduced bed depth. The reduction in removal efficiency post-breakthrough was more dramatic at high up flow rates.

The same magnetite was used in all the trials and was the same as that used in the earlier examples. The 1.5 to 6 mm magnetite was effectively used for almost a 6 week period, during which time it was manually washed 13 times. The 6 to 10 mm magnetite was also used in the earlier examples, but had been in storage for the 6 week period required to complete the 1.5 to 6 mm trails. When back in service it was effectively used for almost a 4 weeks period, during which time it was manually washed 7 times.

Manual washing causes considerable abrasive action and therefore has the potential to demagnetise the magnetite. Despite this potential, the magnetite retained its magnetism and its performance does not seem to have been diminished.

The new polishing tank/inlet configuration was effective but it was evident that resin material was escaping from the bed near the wall of the polisher. This affected the results obtained for all bed depths and both media sizes, and particularly the shallow bed experiments. The wall effect was more prominent during the shallow bed trials and the larger media trials, however, did not seem to be more problematic at the higher up flow rates than at the lower ones.

It is expected that the influence of the wall effect should be reduced in larger polishing tanks and thus the capture efficiency of shallow beds should increase. It is thought that the wall effects could also be reduced by placing a finer cut of magnetite near the walls of the polishing tank to improve hydraulic resistance through this area and to increase magnetite to vessel wall contact thereby reducing the amount of resin fines and other fragments that bypass the magnetite bed. This may improve the removal efficiency of shallow beds up to near the levels achieved with the deep beds. The wall effects may also be reduced by changing the shape of the wall, such as by the inclusion of flanges. Alternatively a soft seal against the wall could be used to decrease the wall effect.

No resin fines or particles were found to settle out below the magnetite bed at any of the up flow rate used in this example, but this may occur at lower up flow rates. The polisher tank could include a drainage outlet below the holed plate to collect any resin that settles at the base of the tank.

A further design modification may be the combination of the polishing tank with a secondary conical settler. In effect the base of the above polishing tank could be replaced with a conical settler. The system may have two outlets, a polished fluid outflow at the top of the polisher tank portion and a resin bead outflow at the base of the settler portion. Any overflow resin not separated by the first settler could be collected and returned to the contactors.

The results from table 2 are summarised in table 3 below.

TABLE 3

Maximum operation flow rates demonstrated for magnetite beds of various particle sizes and bed depths.

| Magnetite particle size | Depth of magnetite bed | Maximum up flow rate for efficient operation |
| --- | --- | --- |
| 1.5 to 6 mm | 50 mm | 44 m/h |
| 1.5 to 6 mm | 350 mm | 50 m/h |
| 6 to 10 mm | 50 mm | <33 m/h |
| 6 to 10 mm | 100 mm | 33 m/h |
| 6 to 10 mm | 150 mm | 33 m/h |
| 6 to 10 mm | 350 mm | 39 m/h |

Figure 6B:
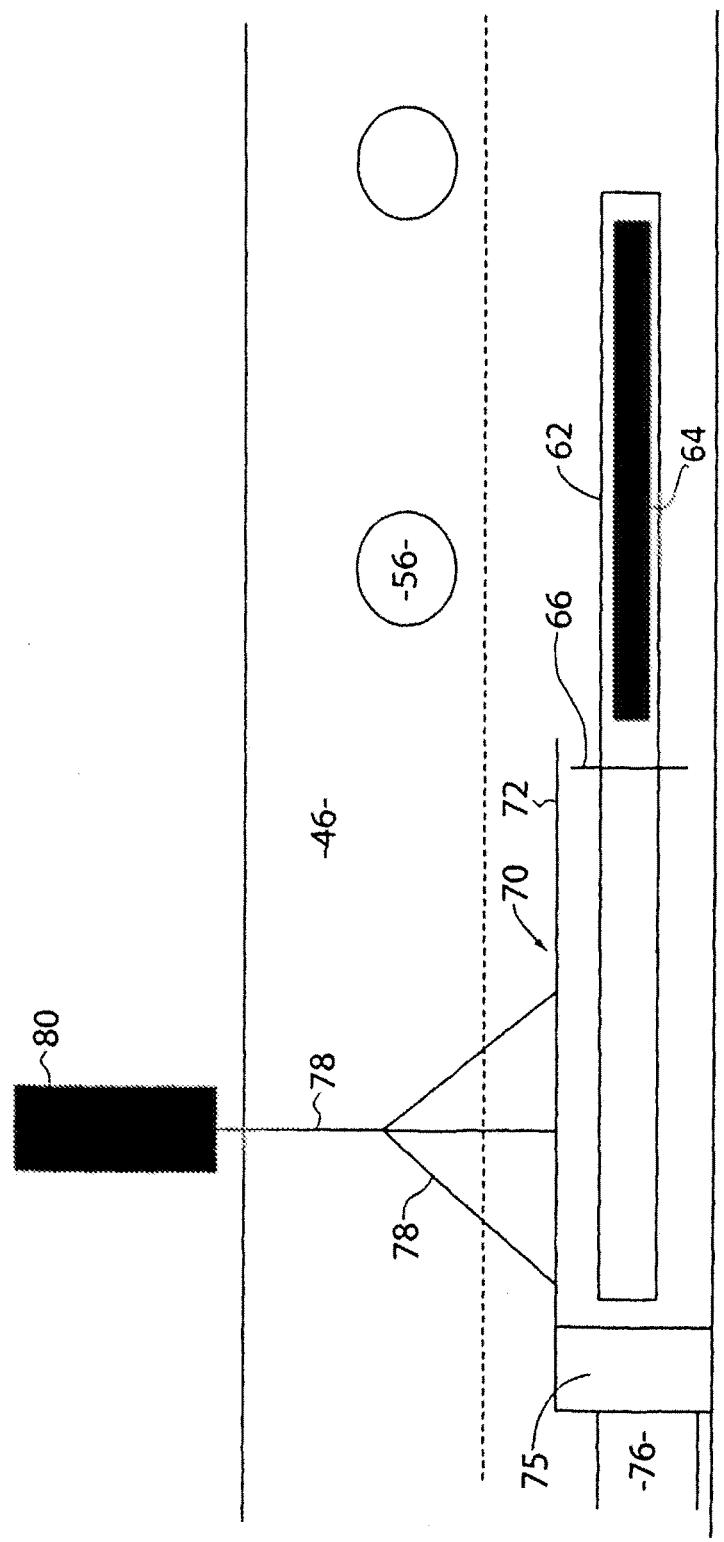
Figure 7A:
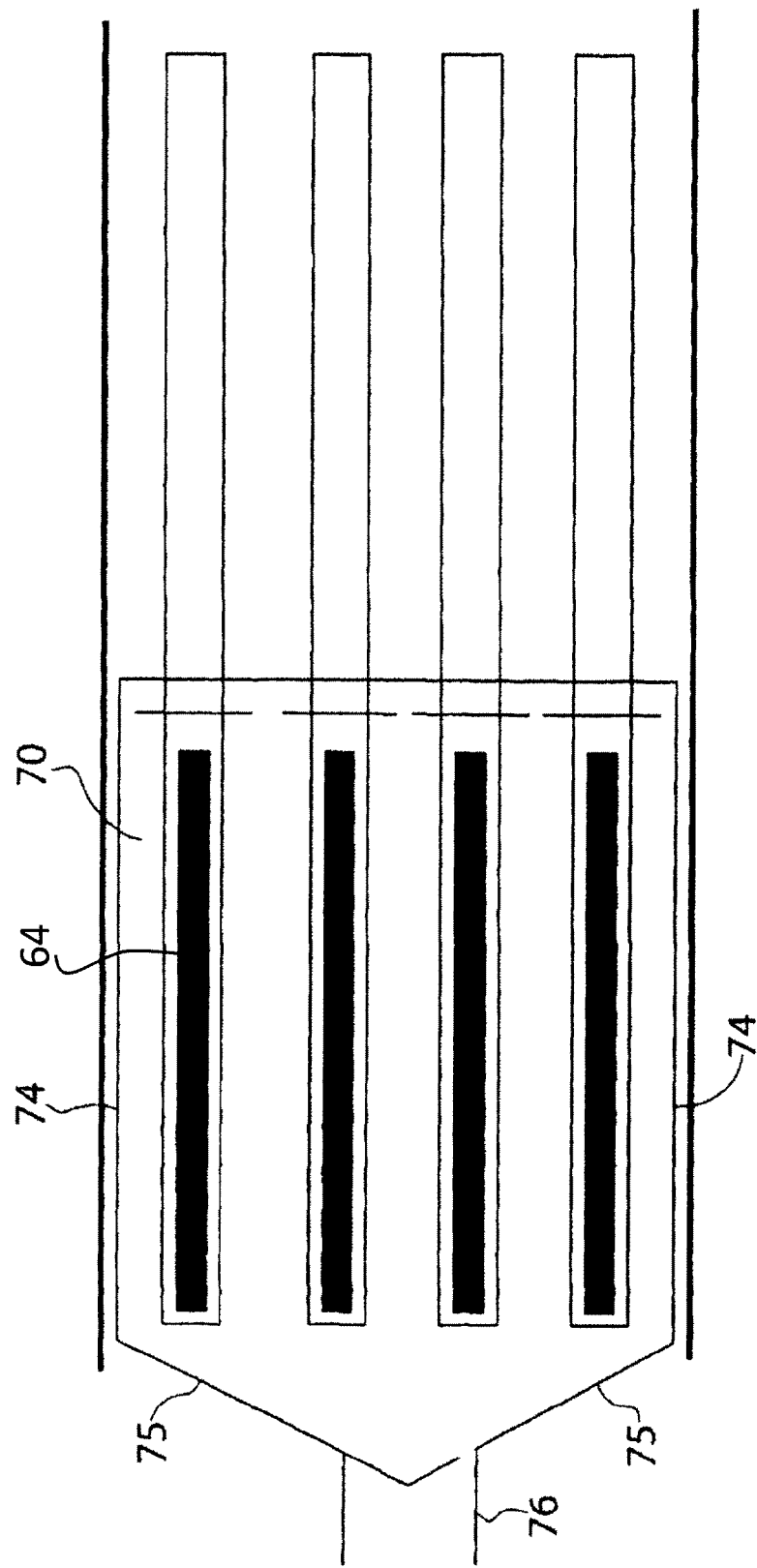
FIGS. 7A and 7B are plan views of the separator and the flow guide of FIGS. 6A and 6B, respectively.
Figure 7B:
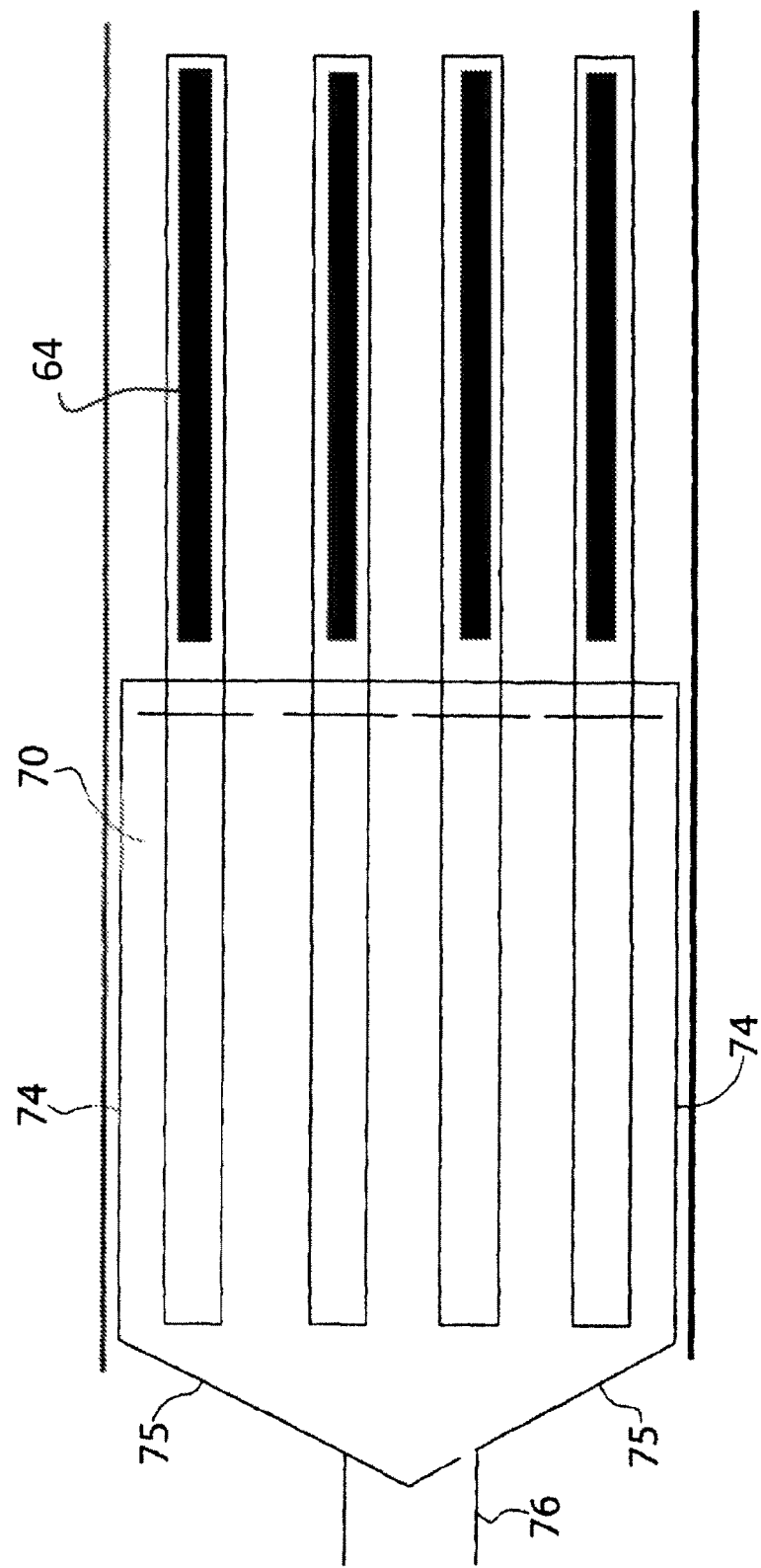
Figure 10:
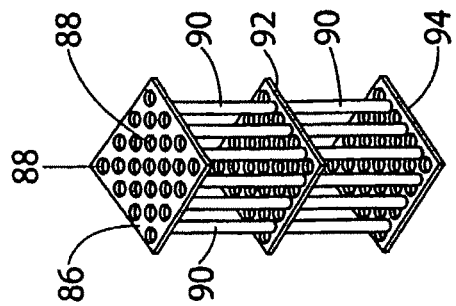
FIG. 10 is an array of elongate members containing moveable magnets incorporated within the separator of FIGS. 8 and 9.
Figure 9:
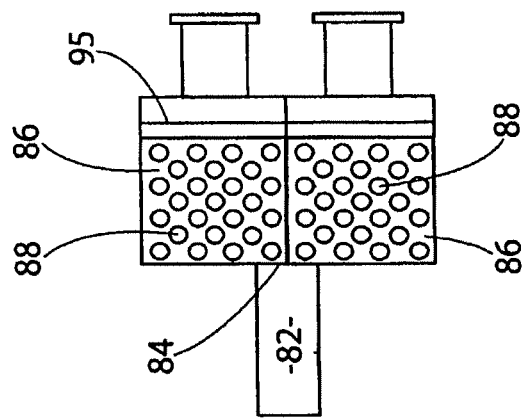
FIG. 9 is a plan view of the separator of FIG. 8.
Figure 8:
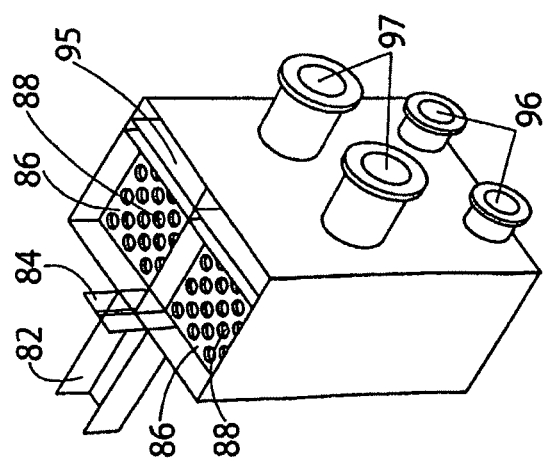
FIG. 8 is a perspective view of an alternative arrangement of a magnetic resin separator having downwardly orientated elongate members containing moveable magnets.

FIGS. 3, 4, 5A, 5B, 6A, 6B, 7A, 7B and 8 to 10 depict an alternative resin separator system in which the bed of particulate magnetic material has been replaced with elongated members containing magnets. FIGS. 3, 4, 5A, 5B, 6A, 7A, and 7B to 7 involve one configuration of the members and FIGS. 8 to 10 show another configuration.

Figure 3:
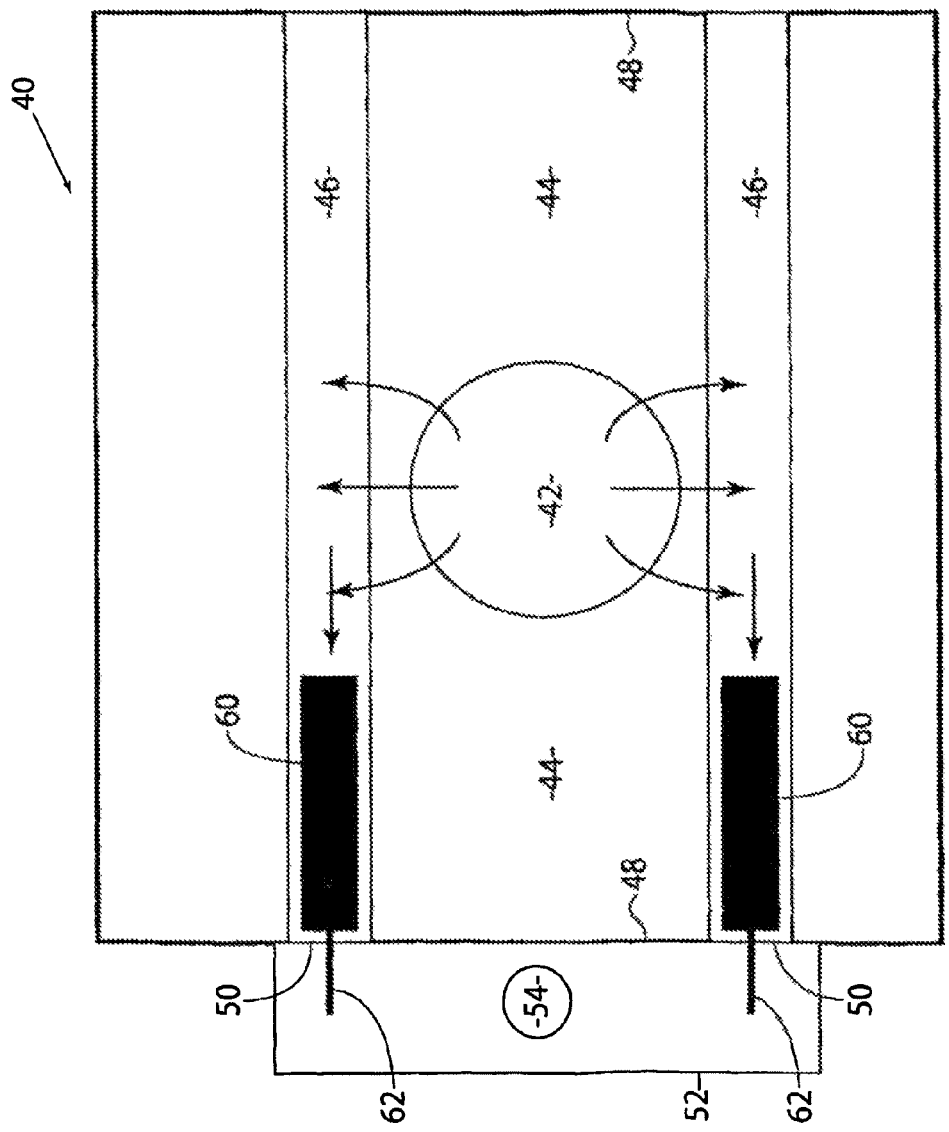
FIG. 3 is a plan view of a settler having two launders and magnetic resin separators located in each launder.

FIG. 3 is a plan view of the top face of a settler tank (40). The unnumbered arrows show the direction of the stream flows.

The settler (40) includes an outlet in the form of a feedwell (42) through which a stream of liquid and residual resin upflow onto the spill surface (44). This stream have passed through the settling process whereby most the resin has been removed from the stream.

The spill surface (44) is inclined to direct the liquid and resin overflowing from the feedwell into two overflow launders (46), which are troughs located on either side of the settler tank. The spill surface is bordered on two sides by the launder and the incline together with the water barrier walls (48) should prevent the stream from flowing into anything other than the launders (46).

The lower surfaces of the launders are inclined and direct the stream towards the launder outlets (50) and into the trough (52) where the streams from the two launders are combined and pass down through the settler outlet (54). The launders can include overflow holes (56) to prevent the uncontrolled overflow of liquid over the sides of the launders (see FIG. 5). The settler is typically located above open contactor tanks and, in the event of a system failure, liquid should pass through the holes and fall back into the contactors. The dimensions of the launders can depend on the dimensions of settler and, for example, can be 200 mm in depth and breadth and 800 mm in length.

Each launder (46) contains a magnetic separator (60). The liquid and resin flow through and pass the separator as they flow along the launder to the outlet (50). Hoses are located at the downstream end of the separators for directing collected resin back to a resin storage tank or the contactors.

Figure 4:
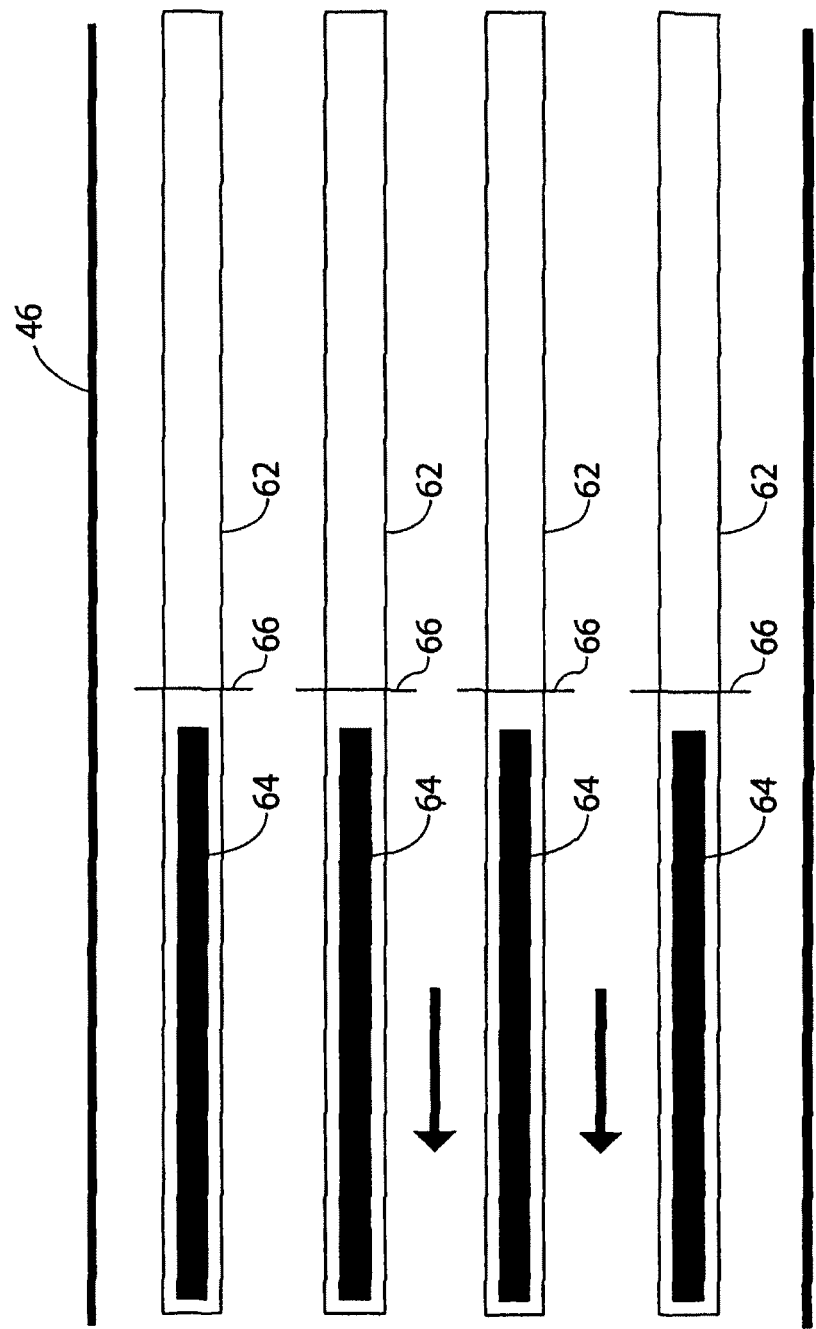
FIG. 4 is a plan view of a magnetic resin separator of FIG. 3 and comprising four separate elongate members containing moveable magnets.

FIG. 4 is a plan view of a separator, shown in more detail, within a launder (46). The separator (60) comprises four elongate hollow tubes (62), each containing moveable magnets (64). The ends of the tubes are sealed to prevent water from entering the hollow section within each tube. A flange (66) circumferentially extends from the outer surface of each tube at or near the middle point of each tube.

Each elongate tube is suspended above the bottom surface of the launder (see the side view in FIG. 5 views in FIGS. 5A and 5B) and substantially equally spaced apart and from the sides of the launder. The ordinary height of the liquid in the launder is indicated by the broken line (67) in FIG. 5 FIGS. 5A and 5B. This arrangement maximises the magnetic field strength around the magnets in the members. The direction of elongation of the members is substantially aligned with the direction of the liquid flow (as shown by the arrows) to maximise the contact time between the resin in the stream with the magnetic field provided by the magnets.

Figure 5A:
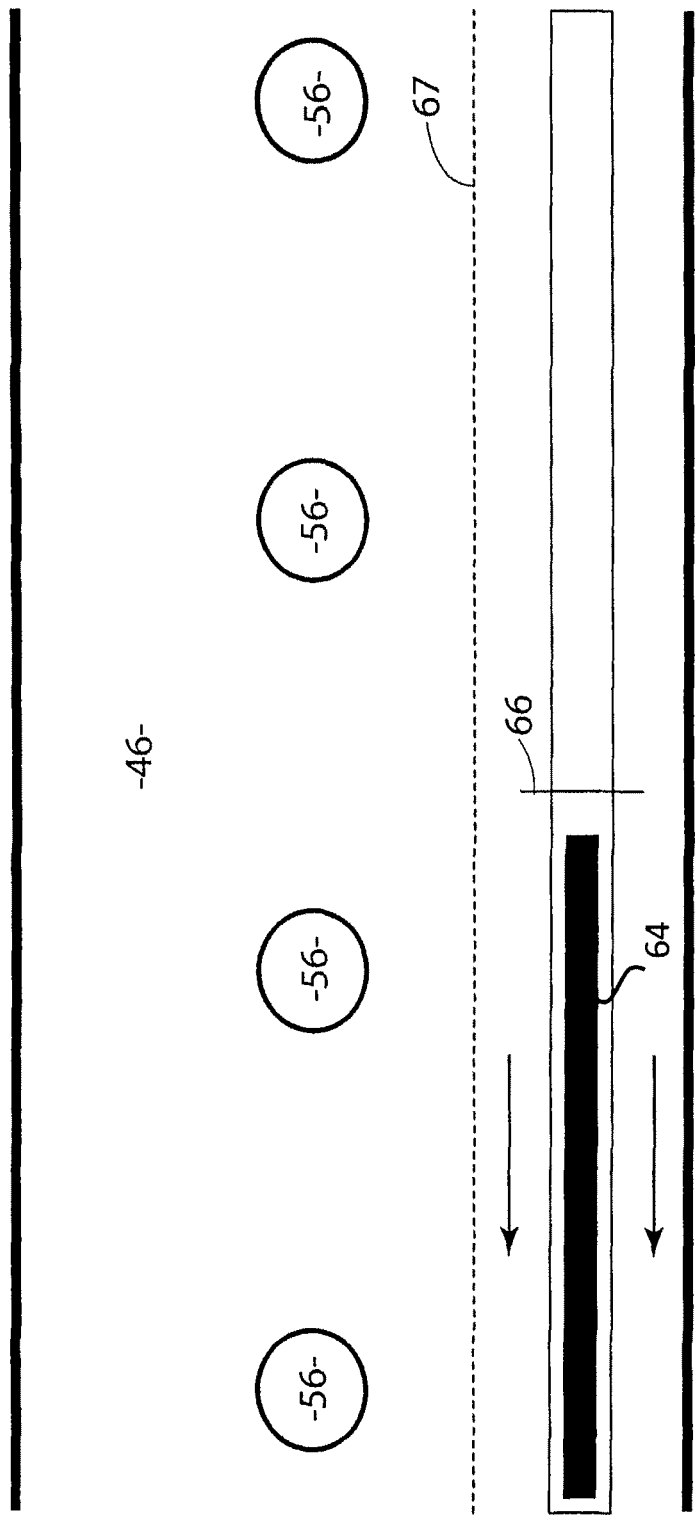
FIGS. 5A and B are side views of a separator in a launder of FIG. 3.

In FIGS. 4 and 5A, the magnets are located in the downstream half of the members. This is the ordinary operating position of magnets. Magnetic resin flowing in the stream interacts with the magnet fields provided by the magnets and are attracted to the magnets. The resin is drawn to the magnets and is held within the flowing stream against the outer surface of the members.

Figure 5B:
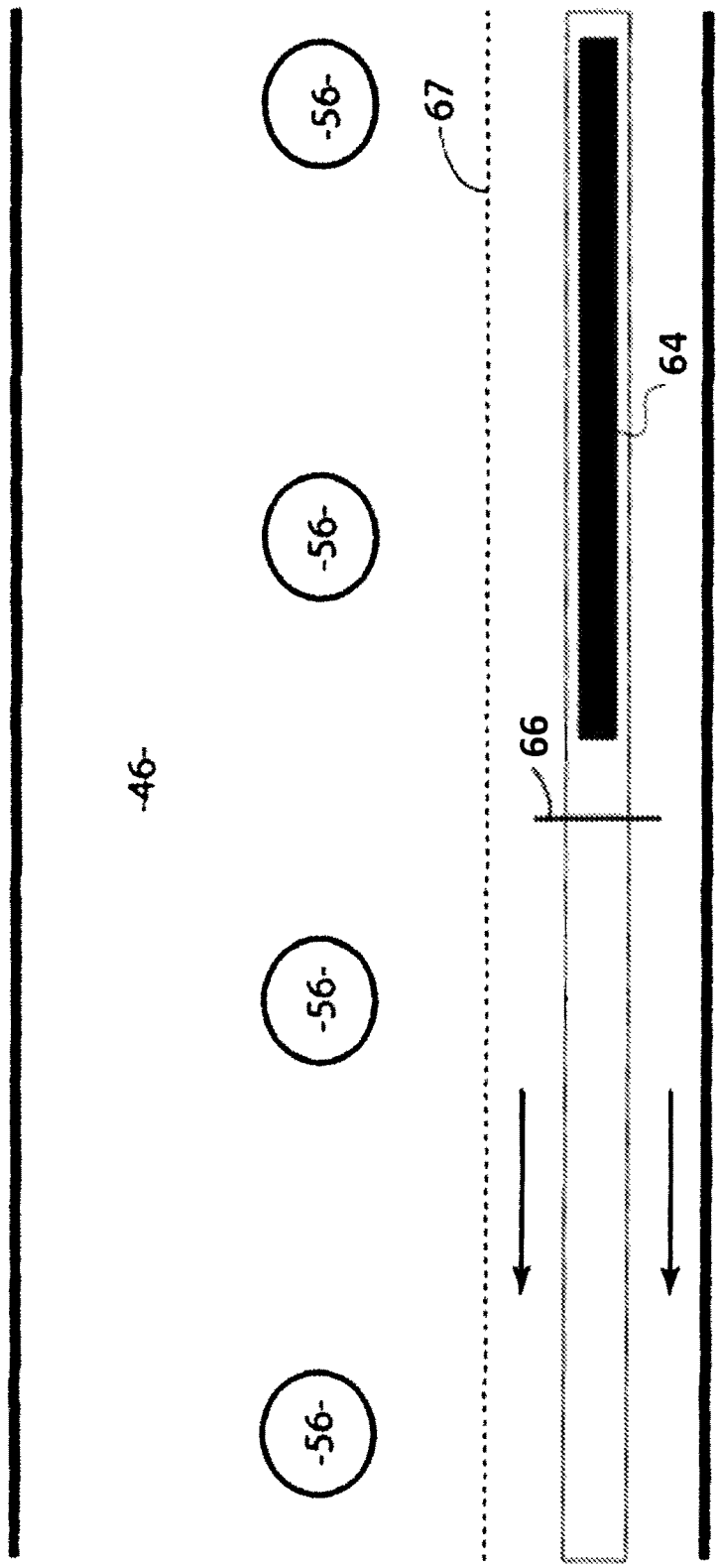
FIG. 5B illustrates moveable magnet in the upstream configuration.

The resin can be released from the members by simply moving the magnets from the downstream end to the upstream end of the members, as shown in FIG. 5B. Resin held by the magnetic field of the magnets is released into the stream when the magnetic field is moved away. The magnet can be rapidly moved by using pneumatic system such as a burst of air to move the magnets from one end of the member to the other. The flange will prevent resin from moving with the magnets past the location of the flange and thereby sufficiently distance the magnets from the resin to release the resin back into the liquid stream.

When the resin is released from the members the released resin will flow downstream within the stream passing by the members. This stream will have a higher resin concentration than ordinarily present and can be collected for subsequent treatment or recycling.

The stream can be collected by temporarily diverting the outflow from launder into a collecting and resin separating tank. The entire stream leaving the launder can be diverted or a flow guide can be used to collect only that portion of the stream containing the released concentrated resin. By this method it is possible to release and collect the resin whilst continuing to operate the rest of the liquid treatment process.

FIGS. 6 and 7 6A, 6B, 7A and 7B show the four members of a separator together with a flow guide (70). The guide comprises a top cover (72), side edge panels (74), end edge panels (75) and pipe section connected to a flexible hose (76). A support assembly (78) connected the flow guide to an engine (80) for positioning the guide. The guide can be moved into position whilst the magnets (64) are located in the downstream end of the members, as shown in FIGS. 6A and 7A. When in position the liquid which flows under the top cover (72) and between the side edge panels (74) continues to flow downstream and is directed by the end edge panels into the pipe section and into the flexible hose. Once the guide is in position the magnets (64) can be moved to the upstream end of the members, as shown in FIGS. 6B and 7B, so any retained resin released from the members into the stream and the stream containing the released resin is then collected via the hose (76).

A similar system can be used with a separator having a smaller or larger number of members. By way of example the side edge panels (74) can be omitted from the moveable flow guide and instead incorporated in the launder as upright panels between some of the elongate members. The top cover and end edge panels of the moveable guide can be located on top of adjacent upright panels so to divert the liquid flow between the adjacent upright panels (and any resin released from members located between the same panels) into the hose.

The collected released resin can be returned to the contactors, sent to regeneration or stored for future use.

The system depicted in FIGS. 3, 4, 5A, 5B, 6A, 6B, 7A and 7B was tested in an operational water treatment plant at Aireys inlet with MIEX®DOC resin. The settler tank was operated at a high upflow rate so that the water leaving the feedwell at the top of the settler contained a significant quality of the residual resin. The system was operated for a short period of time and then the magnet containing hollow rods were visually inspected. It was observed that a significant quality of resin was retained on the rods and the water leaving the system did not appear to contain visible amount of resin. The resin release system was actuated and the magnets moved to the upstream ends of the rods past the flanges and it was observed that all of the retained resin had been released from the rods.

Whilst the elongate members shown in FIGS. 3, 4, 5A, 5B, 6A, 6B, 7A and 7B lie within the launder and are substantially horizontal, it is also possible to use the elongate members in other configurations, including substantially vertical. FIGS. 8, 9 and 10 depict a magnetic separator having substantially vertical elongate members containing movable magnets.

The liquid stream containing residual resin flows along the trough (82) into the separator via the control gate (84). The separator comprises two independent separators and the control gate allows one of the separators to be shut down by diverting the entire outflow from the trough into the other. The liquid flow passes through the open gate onto a top grating (86) containing a plurality of holes (88) through which the liquid passes downward. Each separator includes a framework (see FIG. 10) of hollow elongate members (90) located between the holes, each member containing moveable magnets (not visible). In ordinary operation the magnets reside at the bottom of the members. The liquid travels down the framework of elongate members (90), through holes in the intermediate grating (92) (which also acts as an intermediate flange for each rod) and holes in the lower grating (94) before flowing under the baffle plate (95) and out of the separator outlet pipes (97). Near the base of the separator are drainage outlet pipes (96) for use in emptying the separator of captured material. The residual resin is attached to the magnetic field provided by the magnets and can be retained on the rods. The retained resin can be removed and collected by moving the magnets upward within the hollow rods and collecting the liquid stream containing the resin from the separator via the drainage outlets (96).

Throughout this specification and the claims which may follow, unless the context requires otherwise, the word "comprise", or variations such as "comprises" or "comprising", will be understood to imply the inclusion of a stated integer or group of integers but not the exclusion of any other integer or group of integers.

The invention claimed is:

1. A process for separating magnetic ion exchange resin from a liquid stream which comprises:
    (a) agglomeration and settling of the majority of the magnetic ion exchange resin from the liquid stream thereby generating a liquid stream containing residual magnetic ion exchange resin;
    (b) passing the liquid stream containing the residual magnetic ion exchange resin into a magnetic separator comprising one or more permanent magnets having a magnetic field to retain the residual magnetic ion exchange resin;
    (c) releasing residual magnetic ion exchange resin retained by the one or more permanent magnets into the liquid stream, thereby increasing the concentration of resin in the liquid stream, and
    (d) temporarily directing outflow of the liquid stream containing the increased resin concentration to capture the released resin, wherein the magnetic field of the one or more permanent magnets, from which retained resin is released, is retained in the liquid stream when the retained resin is released.

2. The process according to claim 1 wherein the magnetic properties of the resin exist throughout the resin.

3. The process according to claim 1 wherein a stream contact surface is located within the liquid stream, and wherein the one or more permanent magnets are located behind the contact surface and the magnetic field of the one or more permanent magnets extends through the contact surface and into the liquid stream such that residual magnetic resin in the liquid stream can be attracted to and retained on the contact surface and wherein the magnetic field can be reduced or moved in response to an actuation means so as to release residual resin retained on the contact surface.

4. The process according to claim 3 wherein the magnetic field can be reduced or moved by moving the one or more permanent magnets away from the stream contact surface.

5. The magnetic resin separation process according to claim 4 wherein the stream contact surface is at least a portion of an outer surface of at least one hollow elongate member containing one or more permanent magnets movable in response to an actuation means between a first position within the elongate member, wherein the magnetic field of the one or more permanent magnets at the stream contact surface attracts and retains magnetic resin on the stream contact surface and a second position within the elongate member wherein the magnetic field of the one or more permanent magnets at the stream contact surface is such that resin retained on the stream contact surface is released.

6. The process according to claim 5 wherein the stream flows along at least a portion of the at least one elongate member in the direction of elongation of the at least one elongate member.

7. The process according to claim 6 wherein the at least one elongate member is positioned within the liquid stream so that the first position of the one or more moveable permanent magnets is located downstream with respect to liquid stream flow from the second position of the one or more moveable permanent magnets.

8. The magnetic resin separation process according to claim 7 wherein the at least one elongate member includes a flange which extends outwardly and circumferentially from the outer surface of the at least one elongate member to prevent the motion of resin beyond the flange as the one or more permanent magnets are moved from the first position to the second position.

9. The magnetic resin separation process according to claim 8 in which when the one or more movable permanent magnets are located in the first position, all of the movable permanent magnets are located on one side of the flange, and when the one or more movable permanent magnets are located in the second position, all of the movable permanent magnets are located on the other side of the flange.

10. The magnetic resin separation process according to claim 9 wherein the magnets are movable from the first position to the second position by pneumatics.

11. The magnetic resin separation process according to claim 10 wherein the resin retained on the contract surface is released into the stream flowing past the contact surface and the stream flowing past the contact surface is collected to capture the released resin.

12. The process according to claim 1 wherein residual magnetic resin is separated from a liquid stream by passing the stream through a bed of particulate magnetic material.

13. The process according to claim 12 wherein the particulate magnetic material is magnetite.

14. The process according to claim 13 wherein the particulate magnetic material comprises magnetite and has an average particle size between 0.3 to 50 mm.

15. The process according to claim 14 wherein resin is released from the particulate magnetic material by forcing a wash solution through the material at a sufficient velocity to free the resin from the magnetic material and optionally air sparging.

16. The process according to claim 15 wherein a boom arm is used to spray the wash solution down onto and through the particulate magnetic material and a cooperating collector moves with the arm beneath the particulate material to collect the separated resin.

17. The process of claim 1 wherein the liquid stream containing the residual magnetic ion exchange resin is passed through an open trough into the magnetic separator.

18. The method of claim 17 wherein the open trough comprises an overflow hole for directing overflow of the liquid stream back into the tank.

19. The method of claim 18 wherein agglomeration and settling of the majority of the magnetic ion exchange resin from the liquid stream is in a resin-settling zone of a tank and the open trough comprises an overflow hole for directing overflow of the liquid stream back into the tank.

* * * * *